H. L. EAVES.
HARROW.
APPLICATION FILED AUG. 25, 1913.
1,097,794.
Patented May 26, 1914.
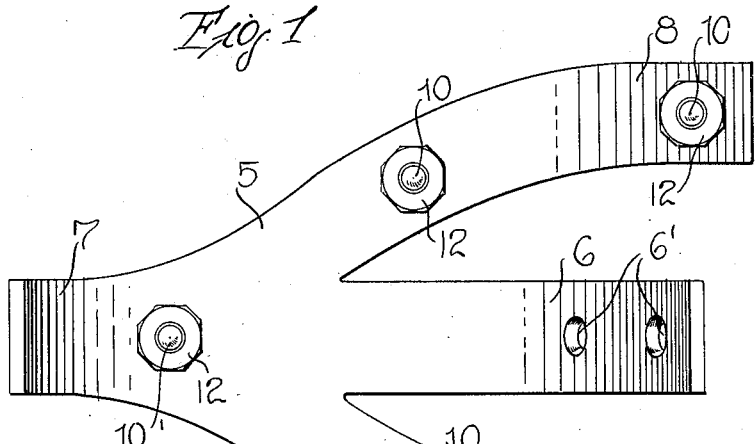
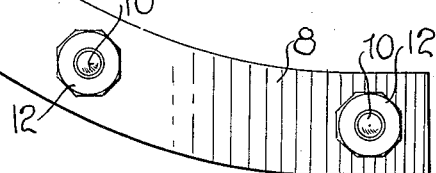
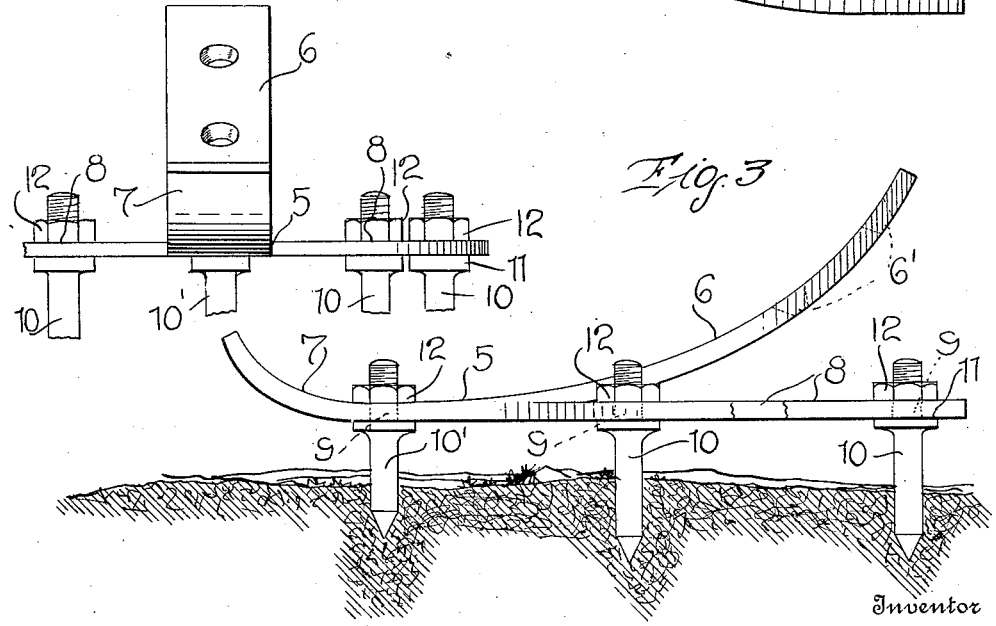
Witnesses
Robert M. Sutphen
A. J. Hurd
Inventor
H. L. EAVES
By Watson E. Coleman
Attorney

UNITED STATES PATENT OFFICE.

HENRY L. EAVES, OF MANGUM, OKLAHOMA.

HARROW.

1,097,794.  Specification of Letters Patent. Patented May 26, 1914.

Application filed August 25, 1913. Serial No. 786,554.

*To all whom it may concern:*

Be it known that I, HENRY L. EAVES, a citizen of the United States, residing at Mangum, in the county of Greer and State of Oklahoma, have invented certain new and useful Improvements in Harrows, of which the following is a specification, reference being had to the accompanying drawings.

This invention relates to harrows and it more particularly relates to an improved sweep-harrow.

One of the objects of the invention is to provide a sweep-harrow of this character which is especially designed to be attached to the foot pieces of a cultivator, for the purpose of stirring the soil or breaking the crust thereof which forms after it has rained and the sun has baked the soil.

Another object of the invention is to provide a harrow of this character which is designed to be operated in contiguity with the young and tender plants without detriment thereto in the event that the harrow moves into contact therewith.

Another object is to provide a harrow of this character which is simple of construction, comparatively inexpensive, strong, durable and thoroughly practical and efficient.

In the accompanying drawings which supplement this specification, Figure 1 is a top plan view of my improved sweep harrow. Fig. 2 is a front elevation thereof, the lower portion of the teeth being broken away, and Fig. 3 is a side elevation.

In these drawings in which similar reference characters correspond with similar parts throughout the several views, the body 5 of the harrow is preferably formed from a single sheet of metal, and may be easily stamped by ordinary methods and means. This body or frame is forked, the middle fork or tang 6 being in alinement with the line of travel and with a forward projection or tongue 7 which is gradually curved upward. The outside or lateral tangs 8 are gradually curved inward and converge in the direction of the forward end of the plate or frame. The tangs 8 are each provided with apertures 9 through each of which extends the screw threaded upper end of a harrow tooth 10, each said harrow tooth being provided with a shoulder 11 which fits snugly against the lower surface of the frame 5, while a nut 12 is provided on each tooth 10 for securing it on the frame. At the conjunction of the elements 7 and 8, the body is apertured for the reception of a harrow tooth 10', said tooth being the same as the teeth 10 in all respects except that it is somewhat shorter, preferably about one-half of an inch. The supporting element or tang 6 is provided with apertures 6', through which bolts or other anchoring devices may be extended for securing the harrow on the foot piece of a cultivator. This tang 6 is gradually curved upward and rearward, and the curvature thereof may be made to conform to the configuration and position of the cultivator foot piece to which it is to be attached. The frames 5 are preferably formed of temperable steel so that the tang 6 may be properly shaped for fitting any particular cultivator and may thereafter be tempered, so as to comprise a spring so that the harrow may have limited movement over stumps, roots and stones, relative to the cultivator, without detriment to the harrow.

It will be seen that I have provided a device of this character which is fully capable of attaining the desired objects, as specified in the foregoing, in a thoroughly practical and effective manner.

While I have shown and described the preferred form of my invention, it will be obvious that various changes in the details of construction and in the proportions may be resorted to for successfully carrying my invention into practice without sacrificing any of the novel features or departing from the scope of the appended claims.

What I claim is:—

1. A sweep-harrow comprising a frame formed from a single piece of sheet metal into the form of a fork having lateral tangs and an upturned tang between the lateral tangs, teeth carried by the lateral tangs, and a tooth carried by the frame forwardly of the upturned tang; said upturned tang being adapted to be secured to a cultivator foot piece substantially as specified.

2. A sweep-harrow comprising a frame formed from a single piece of sheet metal into the shape of a fork having lateral tangs and an upturned tang between the lateral tangs and an upturned extension in alinement with said upturned tang, and harrow teeth carried by the frame, said upturned tang being adapted to be secured to a foot piece of a cultivator.

3. A sweep-harrow comprising a plate of metal having a forwardly and upwardly extending tongue and having apertures therethrough, harrow teeth secured in the apertures, and a tang of temperable steel extending rearwardly and upwardly from the plate and being adapted to be secured to a cultivator foot piece.

4. A harrow frame comprising a single piece of sheet metal formed in the shape of a fork with lateral tangs and an upwardly and rearwardly curved tang between the lateral tangs, the lateral edges of said harrow frame being forwardly converging, and the front end thereof being formed with a forwardly and upwardly extending tongue.

In testimony whereof I hereunto affix my signature in the presence of two witnesses.

HENRY L. EAVES.

Witnesses:
D. R. DIAL,
J. T. JOHNSON.

Copies of this patent may be obtained for five cents each, by addressing the "Commissioner of Patents, Washington, D. C."